United States Patent Office 2,721,116
Patented Oct. 18, 1955

2,721,116

PROCESS OF EXTRACTING BERYLLIUM OXIDE FROM BERYL

Robert A. Schoenlaub, Cleveland, Ohio, assignor, by mesne assignments, to Sylvester Processes, Inc., Solon, Ohio, a corporation of Ohio No Drawing. Application September 21, 1951, Serial No. 247,613

5 Claims. (Cl. 23—16)

This invention pertains to the extraction of beryllia from beryl.

The extraction of beryllium from beryl is a difficult process. Beryl usually contains only about 12% BeO or 5% Be. The beryllium is so tenaciously held and constitutes so little of the ore that its removal by chemical means is complicated and expensive and then not all of the beryllium is recovered. Reduction is not an effective means of recovery for the reason that the vapor pressure of beryllium is high and it has about the same affinity for oxygen as silicon and aluminum, the principal associated substances.

The extraction of beryllium is also industrially hazardous. Soluble beryllium compounds, when ingested, will attack vital organs, particularly the liver. In contact with the skin, it causes dermatitis or lesions. As air-borne dusts or vapors, it will cause acute or chronic pneumonitis. It is so toxic that persons residing near an extraction plant, but with no direct contact, have been fatally affected.

The objects of my invention are to obtain beryllium oxide from beryl in a simple, inexpensive manner, to obtain a higher recovery of the beryllium values than hitherto has been considered possible and to keep the beryllium in an inert insoluble form and to handle it so that air-borne dusts and vapors are not created.

To the accomplishment of the foregoing and related ends, said invention then comprises the features hereinafter fully described and particularly pointed out in the claims, the following description setting forth in detail certain embodiments of the invention, these being indicative, however, of but a few of the various ways in which the principle of the invention may be employed.

Broadly stated, my invention is a relatively simple process. I merely melt beryl with a mixture of basic materials so that beryllium oxide is displaced from its silicate combination to discrete beryllium oxide crystals. I then grind the cooled slag and remove the beryllia from the slag without dissolving it or forming soluble compounds as has been previously necessary.

Some complex technology is involved in creating a chemical environment in which beryllia is very insoluble and yet from which it can be readily removed. I have found that in acidic environments such as provided by the metasilicates, beryllia will form glasses or complex silicates and is inextractable. In very basic environments, it forms berylliates and is also inextractable. Beryllia seems to fall free when formed with the orthosilicates but only with some of these. Orthosilicates are silicates in which the ratio of the oxygen of basic functioning oxides is to the oxygen of acidic functioning oxides as 1:1. Forsterite, $2MgO \cdot SiO_2$ is a simple example.

The greatest displacement of beryllia occurs when magnesia is used as a displacing base. This reaction can be written as follows:

(1)   $3BeO \cdot Al_2O_3 \cdot 6SiO_2 + 13MgO$
$\rightarrow 3BeO + MgO \cdot Al_2O_3 + 6(2MgO \cdot SiO_2)$

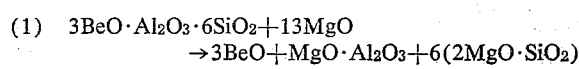

Beryllia is not easily extracted from a magnesia system and suitable magnesia is difficult to obtain.

Under some conditions BeO will fall free if calcia is used as a displacing base. The reaction may be written as follows:

(2)   $3BeO \cdot Al_2O_3 \cdot 6SiO_2 + 12CaO \rightarrow 3BeO +$
$2CaO \cdot Al_2O_3 \cdot SiO_2 + 5(2CaO \cdot SiO_2)$

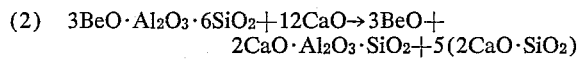

However, too much BeO is lost in the calcium aluminates or silicates as a solid solution, although any beryllia which is present is readily extractable.

Best results are obtained if beryl is reacted with both CaO and MgO such as is obtained from mixtures of limestone and dolomite. The reaction is complex but may be represented as follows:

(3)   $3BeO \cdot Al_2O_3 \cdot 6SiO_2 + 7CaO + 5MgO$
$\rightarrow 3BeO + 2CaO \cdot Al_2O_3 \cdot SiO_2 + 5(CaO \cdot MgO \cdot SiO_2)$

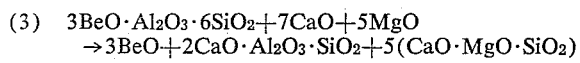

The beryllia in such a system is free and rather easily removed.

It should be noted that the solubility of beryllia in the orthosilicates or associated matter is the controlling factor in compositions which can be used. The slags will normally contain only about 5% BeO and about 95% silicates, etc. If the beryllia is absorbed or combined with the associated matter by any mechanism in amounts of only .2% of the associated matter, about 5% BeO will be lost. If combined in amounts of 1%, 20% will be lost; 2%, 40% will be lost, etc. Considering the amphoteric and evanescent nature of beryllia, it is surprising that the degree of insolubility obtained by my process is possible.

In a general sense, the chemical environments in which beryllia is displaced from beryl are the orthosilicates of calcium and magnesium, in which the calcium and magnesium are used in approximately equal molecular amounts. In such environment the magnesia renders the beryllia free and the calcia renders the silicates extractable. Other strong bases can be used instead of CaO and other weak bases can be used instead of MgO but the combined use of CaO and MgO is preferred.

Strong bases, which may be used, in order of decreasing strength are $K_2O$, $Na_2O$, BgO, SrO, CaO. Weak bases which may be used are MgO, $Al_2O_3$ and of lesser importance FeO, ZnO and MnO.

Strong bases are characterized by their ability to form digestible orthosilicates; however, they are likely to take up beryllia in solid solutions.

Weak bases are characterized by their ability to form spinels (RO)($Al_2O_3$) which are insoluble in mineral acids. Beryllia however seems to reach its maximum insolubility when types of spinel are present.

To obtain digestibility strong bases are used, but to obtain insolubility of beryllia weak bases are used in conjunction with the strong bases, to form orthosilicates. Furthermore, the alumina present is combined largely in extractible orthosilicates such as gehlenite, nephelite, and the like.

For example, the simplest extraction utilizes combinations of calcium and magnesium oxides as derived from dolomite, limestone and the like. A representative reaction is as follows:

(1)
$3BeO \cdot Al_2O_3 \cdot 6SiO_2 + 7CaO + 5MgO$
$3BeO + 2CaO \cdot Al_2O_3 \cdot SiO + 5(CaO \cdot MgO \cdot SiO_2)$

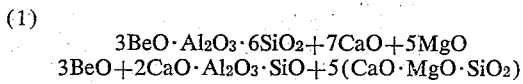

Another example is as follows:

(2)
$3BeO \cdot Al_2O_3 \cdot 6SiO + Na_2O + 4CaO + 4MgO$
$3BeO + Na_2O \cdot Al_2O_3 \cdot 2SiO_2 + 4(CaO \cdot MgO \cdot SiO_2)$

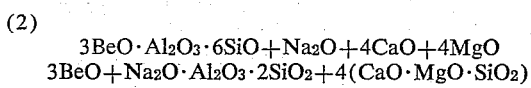

In Reaction 1 recoveries will be from 90 to 96% of the beryllia present but the beryllia will contain small amounts of alumina and magnesia in the form of undigested spinels. In Reaction 2 recoveries will be lower but there will be no spinel.

Thus it can be seen that for each molar weight of beryl it is desirable to add 7 moles of CaO, the strong base, and 5 moles of MgO, the weak base. Or we may add one mole of $Na_2O$, a very strong base, and 4 moles of CaO, a strong base and 4 moles of MgO, the weak base. In a similar manner, weak basic oxides, capable of forming spinels ($RO \cdot Al_2O_3$) may be substituted in part for the MgO. Usually for each molar part of beryl we add from 5 to 8 molar parts of a strong base and from 3.5 to 5.5 parts of MgO or in some cases its equivalents.

The processing is quite simple. Beryl is mixed with basic materials such as CaO and MgO in suitable amounts to form orthosilicates and melted. This usually requires a temperature of at least 2400° F. After melting to a homogeneous slag, the material is slowly cooled during crystallization which will be from about 2400° to 2000° F. It is then crushed to —250 mesh and made into about a 5% slurry with water. It is then reacted with mineral acids used in about a 10% excess for one to three hours with constant agitation. The residual solids are washed free of the dispersed silica and soluble salts and concentrated.

This product will comprise a concentrate containing from 60 to 85% BeO. From 90 to 97% of the beryllia in the starting material will be obtained and from 90 to 95% of the foreign matter will be rejected, the exact amount depending upon the specific compositions and techniques used. This is an unique concentration in the beryllia art and is obtained in a simple and safe manner. The beryllia has been rendered insoluble and the silicate soluble in contrast to former art.

There are a few operating precautions that should be observed. Beryl contains about 5% alkalies. These will decrease the recovery from about 95% to 85%. They can be eliminated by volatilization at high temperatures or by the incorporation of chlorides or sulphates in the raw batch. It is preferable to smelt at 2900° F. for this reason. A certain proportion of the iron in the starting material will go to the concentrates. This can be reduced by carbon or calcium carbide and removed magnetically. In acid digestion the silica concentration should be kept below 1½% of the slurry, excessive concentration of acid avoided and at no time should the pH of the slurry be allowed to rise above 3. Within these limits the silica will be dispersed and can be removed as if it were a true solution.

It is possible to make a final concentrate in a single step. However, it has been my experience that high recoveries and high purities are antagonistic objectives. I, therefore, prefer to use two steps, the first step being adjusted to give a maximum recovery and the second step the maximum purity.

The purification of the concentrate after the rejection of 90% or more of the gangue is no longer difficult. It can be accomplished by mechanical, chemical or pyrochemical means. The easiest concentration is to float the beryllia out with the use of soaps. Beryllia is quite susceptible to flotation but the grain size is usually small. Conventional chemical methods also can be employed. The concentrate is digested in concentrated hot sulfuric acid and purified by crystallization of ammonium alum or similar procedures.

It is cheaper and easier in many cases to purify the concentrate by pyrochemical means. Such means can produce a controlled grain size of individual crystals of beryllia. These are excellent for ceramic and metallurgical purposes. Also, the industrial hazards of pyrochemical methods are less than chemical methods.

The easiest pyrochemical method is to heat the crude beryllia to about 1700–2200° F. with soda ash. For each 100 parts of concentrate, about 50 parts of soda ash are required. The resultant clinker is crushed and digested with water and finally weak acid, and washed to give a pure beryllia. Beryllia is unattacked by $Na_2CO_3$ except for such slight decomposition of the carbonate that may occur. I use this novel reaction as an analytical procedure for evaluating products.

It is also possible to react with calcia, a procedure which was previously regarded as unsatisfactory. It has been shown that if gangue material has a solid solubility of 5% of BeO and amounts to 95% of the slag, the loss of beryllia will be 100%. If, however, the beryllia is 70% and the gangue 30%, the losses with a similar solubility are 2%, a negligible amount.

The calcia reaction works better if the concentrates contain less than 70% BeO. Higher percentages of beryllia give melts which are too refractory for easy processing. Purification is accomplished by adding two moles of CaO for each mole of $SiO_2$ and from 1 to 3 moles of CaO for each mole of $Al_2O_3$. If the silica is 7% or more, a dusting slag is obtained which eliminates grinding and its contamination. The batch is heated to about 2900° F., cooled, dusted and ground and extracted as previously described. This gives beryllia of more than 99% purity when properly done. Barium and strontian oxides can be similarly used.

The following are examples of the process of this invention:

I. 100 parts of beryl containing about 65% $SiO_2$, about 20.26% $Al_2O_3$, and about 11.00% BeO, was mixed with 199 parts of dolomite containing 30.5% CaO and 21% MgO. This mixture was fired in graphite to 2700° F., held for two hours, and the temperature lowered at a rate not exceeding 300° F. per hour to 2000° F. This slag was then cooled further and crushed and ground to minus 100 mesh. The ground slag was then made into a 5% slurry with water, and for each 100 parts of slag 2.44 molar equivalent parts of hydrochloric acid were added and the suspension vigorously agitated at room temperatures for four hours. The residual solids were then removed, washed, and made into about a 10% slurry and acid added in amounts sufficient to keep the pH at about 2 and the resulting suspension agitated vigorously for 1½ hours. The resulting residue was washed and de-watered and dried. This residue was then formed into a 10% slurry and conditioned with about 1½ pounds of oleic acid per ton of solids, and the beryllia concentrated by froth flotation. The beryllia was concentrated in the froth. Two stages of cleaning gave the final concentrate. The composition of the slag, the intermediate concentrate, and the final concentrate was as follows:

|  | Slag | First Concentrate | Final Concentrate |
| --- | --- | --- | --- |
| $SiO_2$ | 32.93 | 0.11 | 0.0 |
| $Al_2O_3$ | 9.27 | 19.28 | 2.4 |
| BeO | 4.51 | 72.39 | 96.3 |
| CaO | 30.38 | 0.95 | 0.2 |
| MgO | 21.46 | 7.70 | 1.0 |
| Ig. Loss | 0.45 |  |  |

II. The first concentrate as described in Example I was prepared. The first concentrate was mixed with a limestone containing 55% CaO in the following proportions: First concentrate 100 parts, limestone 28.2 parts. The mixture was fired to 2830° F. in graphite and allowed to cool. It was then ground to minus 150 mesh, made into a slurry in water, and for each 100 parts of slag, 90 parts of commercial muriatic acid were added. The slurry was then agitated for about an hour, de-watered, and the residue washed and dried. The concentrate so obtained consisted of about 99.2% BeO. The recovery of BeO from the first step was about 94% and from the second step about 89%.

III. One hundred parts of —35 mesh beryl (containing 64.84% $SiO_2$, 19.25% $Al_2O_3$ and 11.23% BeO) are mixed with 37.8 parts of —50 mesh limestone (55%

CaO) and 164 parts of −50 mesh dolomite (30.5% CaO, 21% MgO). A total of 19.6 pounds of mixture was placed in a closed graphite crucible. It was then fired to 2800° F. for 2 hours and slowly cooled from 2400 to 2000° F.

The clinker was ground to pass a −100 mesh screen and is of the following size and calculated composition:

| −100 mesh. | Percent | | Percent |
|---|---|---|---|
| −100−200 | 20.85 | $SiO_2$ | 32.2 |
| −200−325 | 16.9 | $Al_2O_3$ | 9.53 |
| −325 | 62.25 | BeO | 5.56 |
| | | CaO | 35.63 |
| | | MgO | 17.1 |

The batch was calculated to give the following orthosilicates and beryllia:

Per cent
Gehlenite, $2CaO \cdot Al_2O_3 \cdot SiO_2$ _____ 25.6
Monticellite, $CaO \cdot MgO \cdot SiO_2$ _____ 68.8
BeO _____ 5.56

Five pounds of ground clinker was added to 100 pounds of water at 75° F. and agitated. 16.1 pounds of 20° Bé. HCl was added and the slurry agitated for three hours. The temperature of the slurry increased to 96° F. due to the heat of reaction. The slurry was allowed to settle overnight, the residue removed and washed. 7.87% of the clinker was recovered as an insoluble residue which analyzed as follows:

Per cent
$SiO_2$ _____ 6.25
Fe _____ 3.22
$Al_2O_3$ _____ 14.77
BeO _____ 68.43
CaO _____ 5.17
MgO _____ 2.15

Recovery of 96.7% of the BeO was obtained.

The concentrates were mixed with limestone in the proportion of 100 parts of concentrate to 35.7 parts of limestone, fired to 2920° F. in graphite and annealed to 2600° F. The product was dusted and ground to −100 mesh. The mineral and chemical composition was as follows:

| | Percent | | Percent |
|---|---|---|---|
| $2CaO \cdot SiO_2$ | 15.4 | $SiO_2$ | 5.33 |
| $5CaO \cdot 3Al_2O_3$ | 24.1 | $Al_2O_3$ | 12.6 |
| MgO | 1.8 | CaO | 21.6 |
| BeO | 58.7 | MgO | 1.8 |
| | | BeO | 58.3 |
| | | Fe | 3.22 |

122 parts of slag was obtained. This was magnetically cleaned, made into a 5% slurry with water and an excess of HCl and agitated for two hours at 150° F. The residual solids were separated, washed and dried. They comprised 61 parts containing more than 98% BeO. The overall recovery of BeO was 87%.

While the preferred embodiment of my invention utilizes an admixture of a strong base and a weak base for the purpose of freeing beryllia from beryl, it is nevertheless possible also, as indicated above in connection with the refinement of the concentrates produced by the previously-described process, to use a single base. In carrying out this modification of my process, an amount of base such as CaO is added to the beryl so that the ratio of CaO to the $SiO_2$ present in the mass is about 2.2 to 1. After grinding the mass is smelted producing a dusting slag from which the beryllia falls substantially free but which is preferably further refined by substantially the same process as indicated above for the refinement of the concentrates produced by the process using a mixture of bases. In other words, to the residue there should be added an amount of CaO sufficient to convert at least a substantial proportion of the aluminates to $3CaO \cdot Al_2O_3$. This mixture is then smelted again to about the temperatures previously indicated after which the smelt is comminuted and the beryllia in purified form recovered therefrom.

The BeO produced by my process as above described when using the combination of a strong base and a weak base is in a crystalline form which is novel.

These crystals are hexagonal or more specifically, they are dihexagonal pyramidal. This means that they are hexagonal in cross sections but their top and bottom forms are different, or they are hemimorphic. The tops are pyramids (101 1), the sides are hexagonal prisms (101 0), the base is a basal pinacoid (0001) edged with small pyramids (101 1). The crystals have a prismal cleavage and a hardness of 9.

This is the normal form obtained by the process as described. Flat hexagonal plates may be obtained by using soda and crystallizing at a lower temperature.

The size of crystal is subject to control. It is determined by the speed or velocity of crystallization. If the velocity is high, small crystals are obtained; if low, large crystals are obtained. The only limitations on size are the mechanical ones of control.

The crystals are large enough so that they are not air borne as dusts. This is important from a health standpoint. They also make an excellent abrasive, by virtue of their size, cleavage and hardness.

This application is a continuation-in-part of my co-pending applications, Serial Nos. 649,739, filed February 23, 1946, now abandoned and 760,125, filed July 10, 1947 now abandoned.

Other modes of applying the principle of the invention may be employed change being made as regards the details described, provided the features stated in any of the following claims or the equivalent of such be employed.

I, therefore, particularly point out and distinctly claim as my invention:

1. The process of extracting beryllium oxide from beryl which comprises:

A. providing an admixture in finely-divided form of (a) beryl, (b) at least one strong basic oxide selected from the class consisting of $Na_2O$ and CaO, the total amount of such strong basic oxide used being in the range of from 5 to 8 molar parts of strong basic oxide for each molar part of beryl present; and (c) as a weak basic oxide, MgO in the range of 3.5 to 5.5 molar parts of MgO for each molar part of beryl present;

B. heating such mixture to a temperature of at least 2400° F.;

C. cooling the mass, such cooling being at a slow rate while the temperature of the mass is above about 2000° F.;

D. comminuting the cooled mass; and

E. separating crystalline BeO from such comminuted mass.

2. A process in accordance with claim 1 in which one of the strong basic oxides employed is CaO.

3. A process in accordance with claim 1 in which the molar ratio of and the constituents of said admixture are about 7 molar parts CaO and about 5 molar parts MgO per molar part of beryl.

4. A process in accordance with claim 1 in which the reaction mass is heated to a temperature of from 2400° to 3000° F.

5. A process in accordance with claim 1 in which the comminuted reaction mass is treated with an acid to dissolve the silicates and associated impurities leaving a residue of beryllium oxide.

References Cited in the file of this patent

UNITED STATES PATENTS

| 1,966,371 | Zisch | July 10, 1934 |
| 1,982,873 | James | Dec. 4 1934 |
| 1,983,270 | Earle | Dec. 4, 1934 |
| 2,242,258 | Noll | May 20, 1941 |